United States Patent [19]

Hellerman

[11] Patent Number: 5,980,617
[45] Date of Patent: Nov. 9, 1999

[54] GAS PROCESSING CONTACTOR TOWER

[76] Inventor: Lance W. Hellerman, 3905 Marlowe, Houston, Tex. 77005

[21] Appl. No.: 09/020,361

[22] Filed: Feb. 9, 1998

[51] Int. Cl.[6] ............................... B01D 3/16; B01J 19/30
[52] U.S. Cl. .............................. 96/296; 96/300; 96/326; 96/360; 96/363; 261/101
[58] Field of Search ............................. 96/271–274, 277, 96/286, 296, 297, 300, 322, 326, 328, 355, 360–370; 261/20, 100, 101

[56] References Cited

U.S. PATENT DOCUMENTS

| | | | |
|---|---|---|---|
| 2,587,416 | 2/1952 | Vedder | 96/322 X |
| 2,677,435 | 5/1954 | Reid | 96/272 |
| 2,835,184 | 5/1958 | Leatherman | 261/101 X |
| 3,022,859 | 2/1962 | Sexton | 96/363 X |
| 3,105,749 | 10/1963 | Gebert et al. | 96/296 X |
| 3,400,516 | 9/1968 | de Leon | 96/363 X |
| 3,812,657 | 5/1974 | Lampinen | 96/273 |
| 4,769,186 | 9/1988 | Raybon | 96/328 X |
| 5,810,897 | 9/1998 | Konosu et al. | 96/366 X |

FOREIGN PATENT DOCUMENTS 57-061444  12/1982  Japan ...................................... 261/100

*Primary Examiner*—Robert Spitzer

[57] ABSTRACT

A contraflow gas/liquid contactor tower having a gas diffuser to provide uniform gas flow in the tower, a set of partial helical membrane sheets running generally parallel to the tower axis and the gas flow, supported between an upper liquid distributing hub and a lower support hub, and a mist extractor pack with liquid direction control.

2 Claims, 6 Drawing Sheets

GAS PROCESSING CONTACTOR TOWER

BACKGROUND OF THE INVENTION

1. Field of the Invention

The invention described herein pertains to the processing of natural gas for removal of contaminants such as liquid particles, solid particles, water, carbon dioxide, hydrogen sulfide or other undesirable components by absorption into a suitable liquid. The field of search was 261 "GAS AND LIQUID CONTACT APPARATUS", with possible subclasses 19 "Fluid Distribution", 20 "Systems", 75 "Contact Devices", 94 "Porous Mass", 100 "Porous Sheet", 101 "Surface Contact", 106 "Liquid Flow", and 112 "Film". The invention is believed to fall in the category 261.20.

2. Description of the Prior Art

Contactor devices, including contactor towers have been used for several years as a means for removing undesirable elements from natural gas streams. Contactor towers are pipes through which gas is circulated and liquids or solids are put into contact with the gas to absorb or react with unwanted components. Towers can be roughly divided into four categories, liquid filled, random packing, trays, and structured packing.

Random packing is an application of thin film technology and typically consists of balls, shapes, rings, etc. which are dumped into a tower for a bed over which a suitable liquid is poured. The liquid will theoretically spread out into a thin film covering the packing and giving a large surface area of liquid exposed to the gas which passes up through the bed.

Liquid towers are tanks filled with a liquid chemical solution through which the gas bubbles. These units are relatively large, heavy, and can have significant carryover problems with higher flow rates. If the liquid is not regenerated, the resultant mixture may be considered as hazardous waste and may present disposal problems.

Tray towers consist of one or more trays having various openings through which the gas flows upwards and the liquid passes down from tray to tray. Typical problems with tray type towers are plugging of the openings, channeling of the gas through the trays, loss of downcomer seal, and carryover due to foaming. Foaming is a particular problem because many of the chemical solutions in use have a tendency to foam and the bubbling action of the gas as it passes through the trays creates ideal conditions for foam formation. Due to the inefficiency of the trays, the towers tend to be relatively large and heavy, particularly when higher operating pressures are involved.

Structured packing is an attempt to provide a thin film approach similar to that provided by the random packing but with control over the path of both the gas and the liquid. Most of the structured packing elements in use should be considered as semi-random packing since they do not truly allow for control of the gas flow through the unit. Structured packing also tends to be hard to fabricate and may have a tendency to plug up if there is any amount of debris in the gas stream or the gas has components which may tend to plate out on contact surfaces.

In most practical applications of random packing, tray towers and structured packing, both the gas and the liquid tend to find preferred paths through the bed and full utilization is not achieved.

SUMMARY

The invention is an application of a type of structured packing and thin film technology application for a gas/liquid contactor tower. Thin film technology is applied in a unique way to provide the benefits of structured packing while overcoming the problems associated with channeling, pressure drop, plugging, and fouling of surfaces.

The system which is defined herein is relatively easy to build, will allow precise control over both the gas flow and the liquid flow, will not promote foaming and will take advantage of the efficiency provided by thin film applications. Due to the high efficiency of the unit, the tower can be relatively small and light in weight.

DESCRIPTION OF THE DRAWINGS

The following drawings are provided to illustrate the application of the invention.

DESCRIPTION OF THE PREFERRED EMBODIMENT

Figure 1:
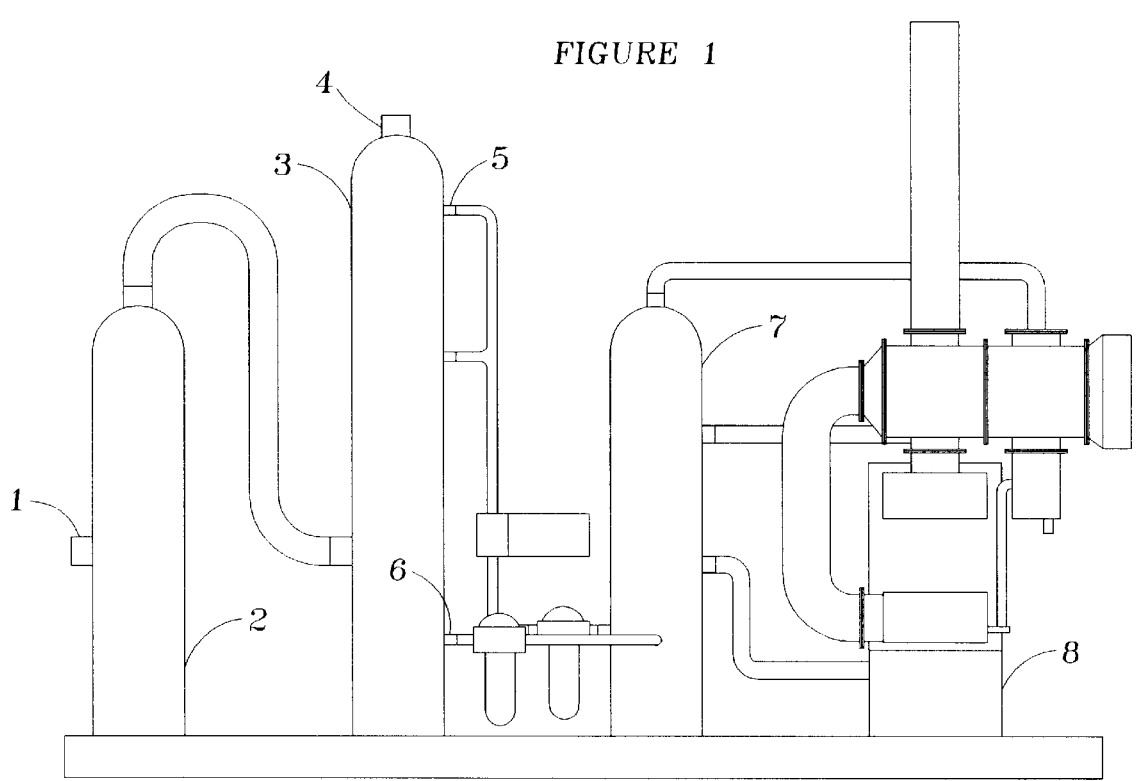
FIG. 1 is a general arrangement of a typical gas processing unit and defines the relative location of the various components and in particular, the location of the gas/liquid contactor tower in the assembly.

The general process flow can be seen on FIG. 1. The gas enters the unit at nozzle (1) and flows into a scrubber (2) unit which removes free liquids and debris. The gas then flows into the base of the contactor tower (3) where the gas flows up and out the top (4) having been processed by being in contact with a suitable chemical solution. The chemical solution enters the tower towards the top (5) and flows down to the discharge point (6) where it exits to be recharged. The solution flows through a heat exchanger section in the bottom of the surge tank (7) and then into the boiler (8) where it is heated and returned to the surge tank. On many existing units the contactor tower must be separately mounted because of its size and weight. The unit must therefore be assembled in the field. The reduced size and weight of the invention allow the unit to be shop assembled and tested.

Figure 2:
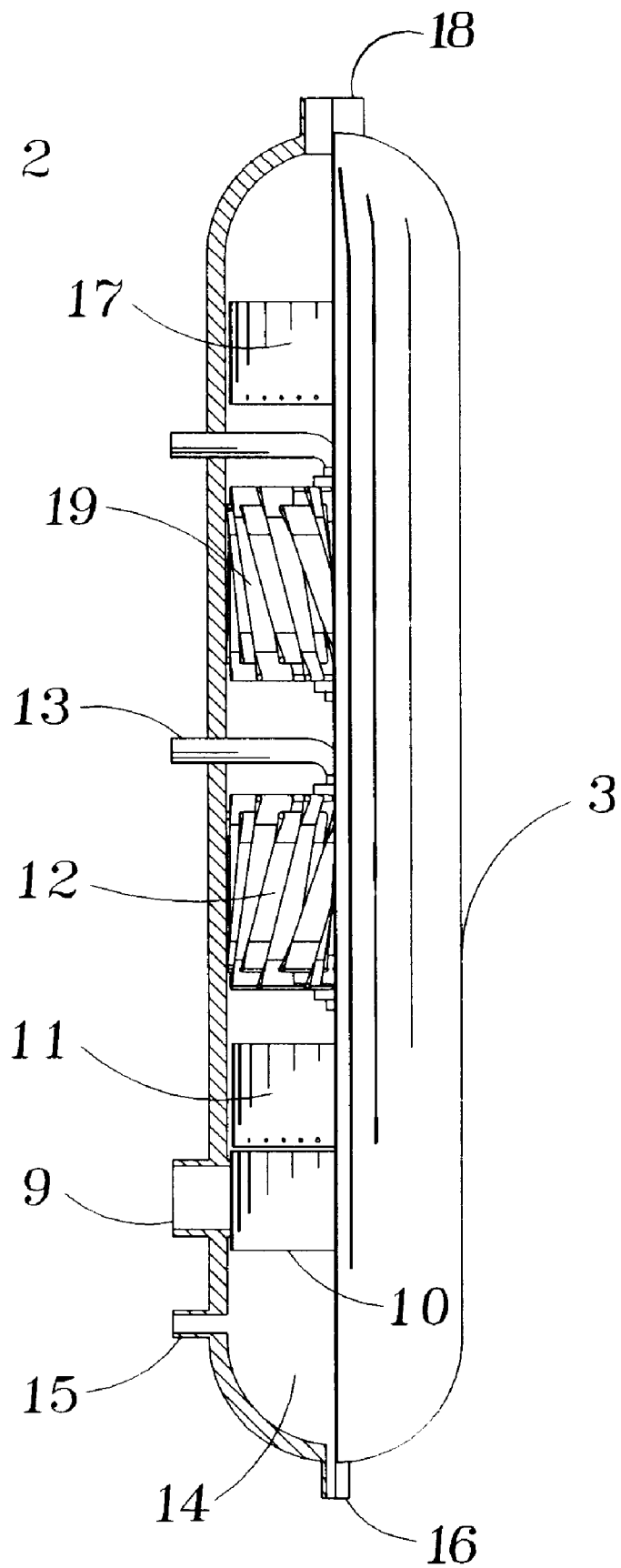
FIG. 2 is a partial section of the contactor tower and positions the various components within the tower.

The details of the invention contactor tower are shown in FIG. 2. The raw gas stream enters the tower (3) at the inlet nozzle (9) located towards the base of the tower. The gas flows into the diffuser tray (10) where the gas direction is changed from horizontal to vertical and the gas volume is distributed over the area of the tower in a uniform manner. The uniform distribution is very important to the overall efficiency of the tower. The gas flows upward at a low velocity (relative to the inlet pipe velocity) through the mist extractor pad (11). The mist pad removes any fine particles in the stream and further evens out the gas flow. The gas then flows into the first contactor element (12).

The chemical solution enters the tower through the side port (13) and is distributed over the element. The chemical solution flows down to the base of the contactor element where it is channeled out to the walls of the contactor tower. The chemical solution flows down the walls of the contactor tower to the base sump (14). Once liquid accumulates in the sump up to the point of the discharge nozzle (15), it is drawn off to be recharged. A bottom drain (16) is provided for periodic removal of sludge from the tower.

The gas continues up past the first element towards the top of the tower. Depending upon the flow rate and the amount of contamination in the gas stream, more than one element may be required. Two elements (19) are shown as being generally required but any number can be installed. After passing through the contactor elements, the gas goes through the upper mist pack (17). This mist pack removes any chemical solution carryover from the gas stream. The liquid is moved to the side of the tower where it streams down the side to the sump. The gas then exits the top of the tower (18).

Figure 3:
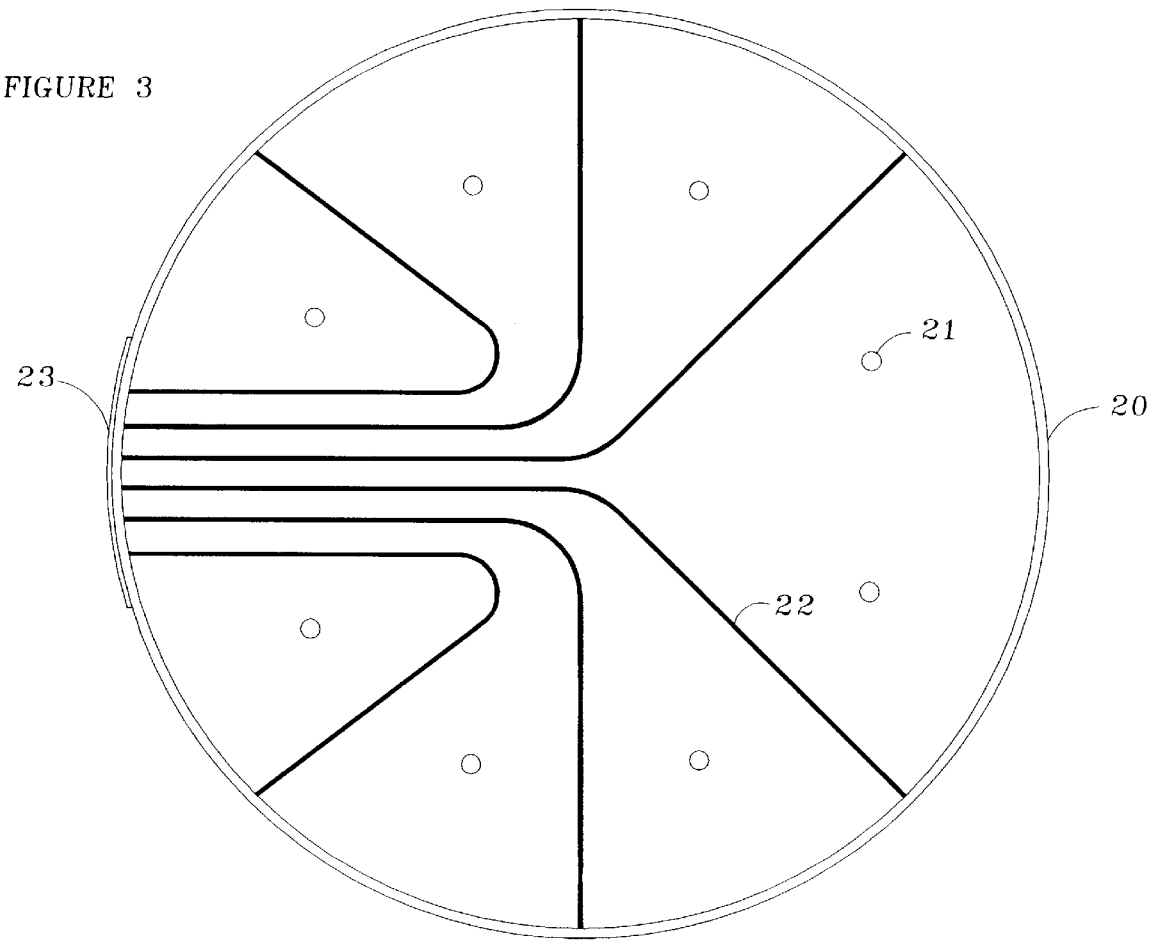
FIG. 3 is a plan view of the diffuser tray used to distribute the gas flow.

The diffuser tray details are shown in FIG. 3. The tray consists of a generally bucket shaped enclosure (20) with a bottom and a side having a diameter slightly smaller than the inside diameter of the tower. Clearance is necessary so that the chemical solution streaming down the walls of the contactor tower will have free passage to the sump. The bottom of the tray contains several holes (21) to allow any liquids which come in with the gas stream and fall out in the diffuser, to drip down into the sump. Vanes (22) are provided in the tray to split the incoming gas flow (23) into several equal portions (8 are shown but this is a matter of convenience). The vanes may be either fixed, if all the flow parameters are known, or movable, if adjustments may be required during the course of operation. The gas exits the diffuser tray out the top.

Figure 4:
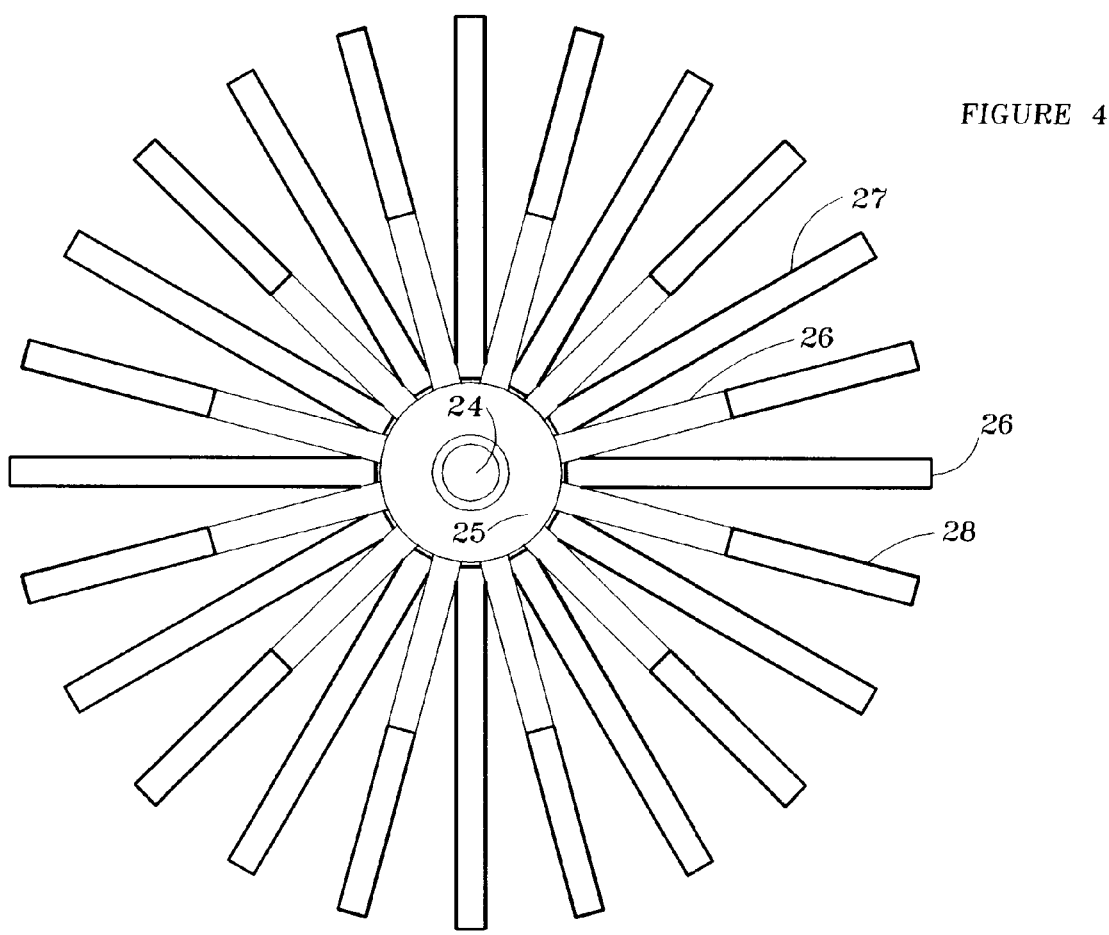
FIG. 4 is a plan view of the contactor element.

A plan view of the contactor element upper hub assembly is shown in FIG. 4. The contactor element hub assembly consists of an inlet port (24) for the chemical solution, a distribution hub (25) for attaching the membrane support arms and for supplying the chemical solution to the membrane support arms (26) and a membrane stretched between each set of support arms. The membranes can be made of any material compatible with the gas, the chemical solution, and the distribution requirements. The membranes are sized to allow for reasonable flow through the unit. Alternative arms will have membranes covering all their length (27) while interspersed membranes may cover only half the arm 28. This spacing and coverage compensates for the separating effect of the radial arms and is necessary to allow for unrestricted gas flow over the cross section area of the vessel while providing good contact availability.

Figure 5:
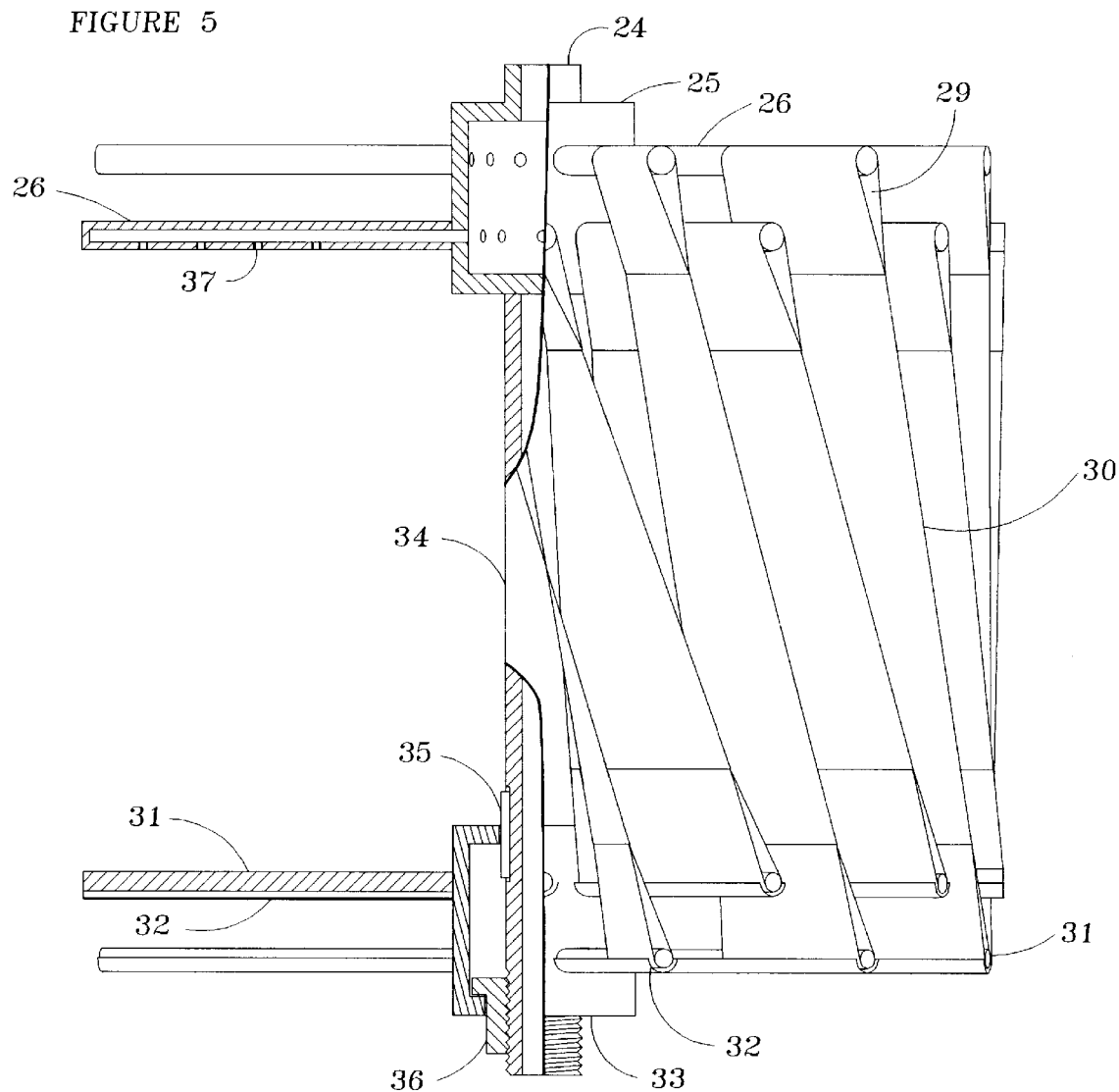
FIG. 5 is an elevation view with a partial cross section of the contactor element and provides the details of the element components.

FIG. 5 provides an elevation view of the element with the membrane sheets removed on half of the view to provide clarity of the membrane support arm details. The chemical solution enters the hub at the top (24) and flows into the hub (25). The chemical solution then flows through the support arms (26) and is distributed to the inside pocket of the membrane (29) by a series of small jets 37. The pocket is filled with a porous material which reduces the velocity of the jets 37 and allows the chemical solution to saturate the membrane (30). The chemical solution flows down both sides of the membrane to the bottom support (31). The chemical solution then drips off the bottom of the membrane into the trough (32) which carries the solution to the side wall of the tower. The membranes are rotated from the top hub to the bottom hub to provide a slight helix form and a slope relative to the longitudinal axis of the element assembly. The exact angle of the slope depends upon the components in the gas, the gas velocity, and the chemical solution requirements. This slope angle forces the gas to become turbulent and mix, thereby increasing the contact effectiveness. The lower hub (23) is supported by a rigid shaft (34) extending from the bottom of the upper hub (25). The lower hub is prevented from rotating relative to the upper hub by a key (35). The angle of rotation of the lower hub relative to the upper hub is controlled by the placement of the key. A sleeve collar nut (36) is provided to allow for easy assembly and subsequent tensioning of the membranes.

Figure 6:
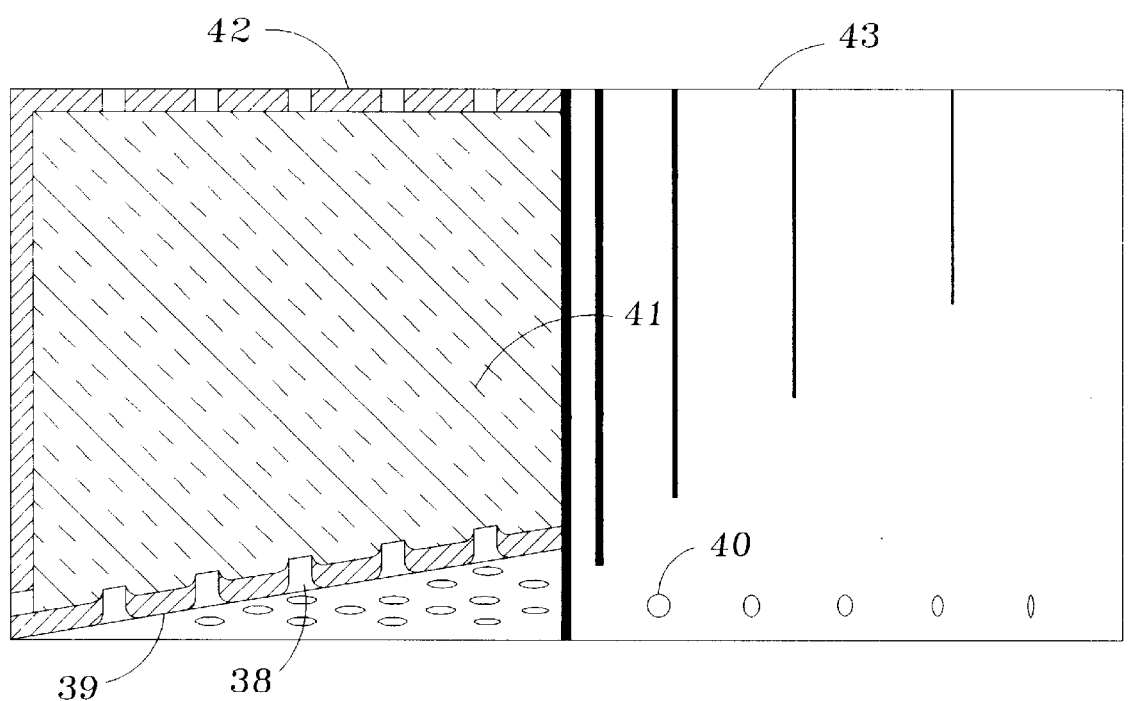
FIG. 6 is an elevation view with a partial cross section of the mist extractor pack.

FIG. 6 illustrates the mist pack assembly and perforation details. The passages for the gas (38) in the bottom plate are upset inward to provide a smooth entrance for the gas and at the same time produce a curb on the upper surface of the bottom plate to keep the liquid from dripping back into the contactor tower center. The bottom plate (39) of the mist pack is cone shaped to encourage drainage to the wall of the tower. The side wall of the assembly is provided with drain holes (40) to allow any liquids to drain to the outside. The interior of the mist extractor pack is filled with a suitable porous material (41) to promote liquid particle coalescing. The top of the mist pack assembly (43) is perforated (42) to allow the gas to exit.

I claim:

1. A contactor element formed by a single upper support and liquid distribution hub, more than one hollow membrane support arms extending radially outward from the upper support hub, a single lower support hub, a lower hub connecting shaft fixed to the upper support hub and generally perpendicular to the plane of the upper membrane support arms, a shaft key between the connecting shaft and the lower support hub, a tensioning nut between the connecting shaft and the lower support hub, one or more spray nozzle holes in each upper membrane support arm, a membrane sheet between each upper membrane support arm and a lower support arm, and a drain trough extending radially outward from the lower hub below each lower membrane support arm.

2. A mist extractor pack formed by an upward pointing conical lower plate having multiple perforations with each perforation having a shoulder on the upper side, a porous media between a top and a bottom plate and inside a side plate, a side plate generally perpendicular to a top plate, with multiple perforations around the bottom edge and connecting the top plate and the bottom plate, and a flat top plate having multiple perforations.

* * * * *